United States Patent Office 3,514,484
Patented May 26, 1970

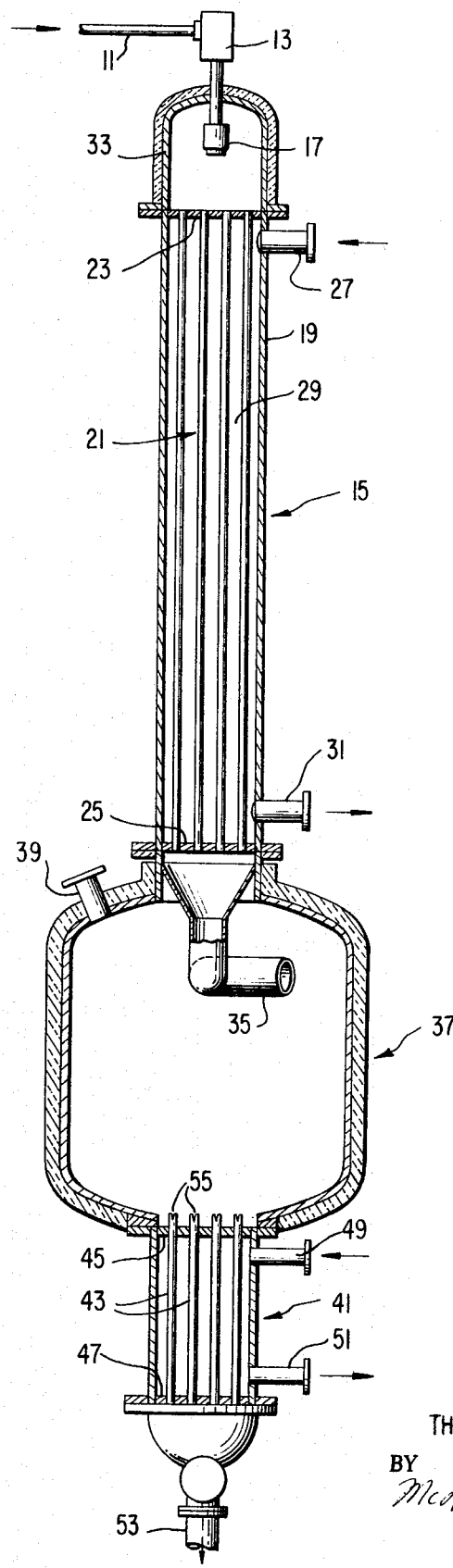

3,514,484
METHOD FOR THE DECOMPOSITION OF UREA SYNTHESIS EFFLUENT
Theodore O. Wentworth, Cincinnati, Ohio, assignor, by mesne assignments, to Allied Chemical Corporation, New York, N.Y., a corporation of New York
Continuation of application Ser. No. 345,457, Feb. 17, 1964. This application Aug. 29, 1968, Ser. No. 756,739
Int. Cl. C07c *127/00*
U.S. Cl. 260—555                                3 Claims

ABSTRACT OF THE DISCLOSURE

A two-step method for the decomposition of liquid ammonium carbamate in urea synthesis effluent and the recovery of vaporous ammonia and carbon dioxide formed is shown. The decomposition takes place in two heated zones; in the first liquid and formed vapors pass concurrently while in the second a thin film of liquid containing carbamate undecomposed in the first zone is passed under the influence of gravity over a heated surface and the vapors formed pass countercurrently. All vapors formed in the two zones are removed in a single zone maintained at a common pressure with that of both of the two decomposition zones and located downstream of the first decomposition zone and vertically above the second decomposition zone.

---

This is a continuation of application Ser. No. 345,457 filed Feb. 17, 1964, now abandoned.

The method of this invention concerns the decomposition of ammonium carbamate present in the liquid produced during the synthesis of urea by the reaction of ammonia and carbon dioxide and which liquid product contains free ammonia. In this system, it is highly desirable to obtain a urea product having little, if any biuret and/or free ammonia.

Urea is manufactured extensively on a commercial basis by the reaction of ammonia and carbon dioxide. In the procedure there is ordinarily provided an excess of ammonia which appears in the product along with urea, ammonium carbamate, water and possibly, although not usually, carbon dioxide. The reactions involved in this synthesis are as follows:

(1)  $2NH_3 + CO_2 \rightarrow NH_2COONH_4$ (2)  $NH_2COONH_4 \rightarrow NH_2CONH_2 + H_2O$

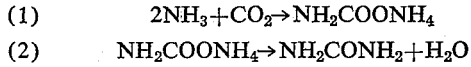

Since Reaction 2 does not go to completion, the product issuing from the urea synthesis vessel contains ammonium carbamate, and in order to utilize the ammonia and carbon dioxide reactants more completely and to provide a purer urea product, the carbamate must be decomposed. The latter operation is conducted in processing equipment other than the reaction vessel, and it leads to the formation of ammonia and carbon dioxide vapors which must be separated and utilized if the overall process is to be economical.

Considerable difficulties have been encountered in the ammonium carbamate decomposition operation. The urea product and carbamate are essentially in the liquid form as they issue from the synthesis vessel and the urea is maintained in the liquid phase during the carbamate decomposition. Vaporous ammonia and carbon dioxide, however, are present in the liquid after the carbamate decomposition and must be separated therefrom. To some extent, the presence of two phases aids the separation but other factors lead to considerable operating problems. As previously noted, heat is needed to effect the decomposition and excessive heating, either by employing temperatures which are too high or by maintaining extended residence times, causes biuret formation and the appearance of this material in the urea directly detracts from the value of the product. Also, as the decomposition reaction is an equilibrium reaction leading to the formation of ammonia and carbon dioxide, the presence of the latter components in the decomposition medium slows the reaction rate and thus early and efficient removal of these vapors from the liquid is desired. Moreover, in addition to the liquid product after the carbamate decomposition having a low carbamate content, if not being essentially free of this component, the operator wishes the product to be low in ammonia to insure more complete carbamate reduction and better ammonia utilization.

Some of these problems have been considered by prior manufacturers and the patent art in this area may be exemplified by U.S. Pats. Nos. 2,267,133; 2,701,262; 2,744,133; 2,913,493 and 3,053,891. By and large, prior systems for accomplishing decomposition of carbamate have been lacking either in that the results obtained were poor, or the procedures devised for effecting the operation were expensive, in many instances due to the large equipment requirements. Frequently, the art has suggested the use of two distinct decomposition vessels, each being followed by a gas-liquid separating stage. Prior procedures have also employed simple distillation of the gaseous components from the liquid phase. In order to get adequate decomposition and separation, however, extended heating periods are required and lead to the undue formation of biuret. As a result, the art has long sought a relatively low cost, effective decomposition process and this need is satisfied by the method of the present invention.

My invention finds particular applicability in carbamate decomposition as exemplified in the urea manufacturing process described above. The invention involves conducting the decomposition in two separate and different types of reaction stages and the method employs a single gas separation zone intermediate the decomposition zones. Most conveniently, these operations are conducted in what amounts to a single or unitary, vertically-aligned vessel although other arrangements of processing equipment can be used.

In the method the liquid to be treated is passed through a heated, vapor-forming decomposition zone and the resulting vaporous material and remaining liquid travel concurrently through this stage. The mixed liquid-vapor product of the first decomposition is charged into a separating zone where vaporous materials are separated from the liquid and withdrawn. Remaining liquid is then passed through a heated second decomposition zone and the vapors formed are removed from the liquid by countercurrent flow, with the resulting vapors passing to the aforementioned separation zone for withdrawal from the system along with the vapors from the initial decomposition stage.

As applied to the carbamate decomposition operation, my method involves passing the urea melt issuing from the synthesis system to the initial decomposition zone. This melt contains urea, carbamate, ammonia, water and may, but usually does not, include carbon dioxide. If desired, excess ammonia and other vaporous materials may be withdrawn from the melt in a preliminary separation but, in any event, the liquid melt will contain some ammonia and water along with the urea and carbamate and, of course, additional ammonia and carbon dioxide will be formed during the decomposition. The urea melt passing into the first decomposition stage is under elevated pressure and as this material travels through the initial heated reaction zone the liquid carbamate decomposes into ammonia and carbon dioxide. The heat during this operation is sufficient to prevent solidification of the reacting mixture and due to the elevated pressure, the reaction mixture passing through the heated zone is at a high velocity which minimizes biuret formation. Also, the liquid and released vapors pass concurrently through the initial decomposition stage and into the intermediate vapor separation zone.

The vapor separation stage may be little more than a vapor collecting area with means for withdrawing the vapors from the melt and thus from the decomposition system. It is preferred, however, that the vapor separation zone provide for the accumulation of at least a small amount of the liquid melt with released vapors overlying the accumulated liquid. Subsequent to the separation zone there is provided a heated second decomposition stage wherein additional ammonia and carbon dioxide vapors are released from the liquid melt essentially as soon as they are formed which further facilitates the decomposition reaction. This countercurrent flow allows the vapor phase components, e.g. ammonia, carbon dioxide, and water vapor, to be reduced in concentration in said vapor phase as melt flows downward in the second decomposition stage, thus allowing nearly complete decomposition in melt leaving the second stage. Thus, to assure efficient separation and removal, the formed vapors are removed from the second decomposition stage in a direction countercurrent to the flow of liquid through this zone. This movement can be accomplished by providing the liquid melt as a thin, falling film, preferably acting primarily under the forces of gravity with their being provided adjacent the liquid free space for separation of the vaporous products. These products pass countercurrent to the flow of liquid and into the vapor collection or separation stage positioned intermediate the decomposition zones; the liquid urea product from the second decomposition being low in biuret and ammonia contents.

The present invention may be better understood by reference to the attached drawing showing the decomposition reaction-separation system, partly in section, described below with reference to a representative operating example.

The urea synthesis melt enters the decomposition system by way of line 11. The melt is at a pressure of 6000 p.s.i.g. and 420° F. and is composed of 8,333 pounds/hr. of urea, 5,886 pounds/hr. of ammonia, 2,710 pounds/hr. of ammonium carbamate and 2,500 pounds/hr. of water. The liquid synthesis product passes through pressure reducing valve 13, positioned on top of the decomposer vessel 15. The melt then passes to a distributor nozzle 17 located within the upper part of decomposer 15 and the nozzle distributes the melt in the form of a cone spray across the entire entrance to the initial decomposing zone 19. The liquid from the nozzles is at a temperature of 220° F. and 200 p.s.i.g.

The initial decomposition zone 19 is shown as a generally cylindrical, indirect heat exchanger of conventional design. For instance, the exchanger may have a tube bundle 21 extending twenty feet between upper and lower tube sheets 23 and 25. Saturated steam at 50 p.s.i.g. enters by line 27 into the jacket 29 surrounding the tube bundle 21 and the heating steam exits the jacket by line 31 at the lower portion of the initial decomposer section.

The sprayed liquid and vaporous components present initially therein and formed during decomposition in member 15 pass concurrently as a relatively high velocity, e.g. 80 feet per second mixed liquid-vapor phase through the inside of the tubes in bundle 21 in 0.25 second. Suitable residence times in this zone are about 0.1 to 5 seconds, preferably about 0.2 to 0.5 second. The size of the tubes is 0.75 inch in diameter and such that there is no separate, essentially-free vapor space available and the vapors and liquid are conveyed concurrently as the relatively high velocity stream, e.g. often about 10 to 150 feet per second, preferably about 50 to 100 feet per second. The head 33 enclosing the nozzle section 17 may be jacketed with insulation to help maintain the elevated temperature. The temperature throughout the decomposing vessel is sufficiently high to prevent the formation of any substantial solid phase.

The liquid melt and vapors issuing from the tube bundle 21 at 275° F. and are collected and passed by way of tube 35 into separator section 37 in a tangential manner. The separator 37 is a generally cylindrical, insulated reaction vessel having an outlet 39 in its upper portion for withdrawing vapors and having means in its lower portion for accumulating the partially decomposed liquid melt. The conditions in the separator vessel are essentially 200 p.s.i.g. and 275° F.

Attached to the lower end of separating vessel 37 is the second decomposition stage 41. As shown, this decomposer has a bundle of tubes 43 extending four feet between upper tube sheet 45 and lower tube sheet 47. The tubes, 0.75 inch in diameter, are heated indirectly by steam entering line 49 and exiting by way of line 51. The steam entering line 49 is saturated and enters at 200 p.s.i.g. Tubes 43 extend above the upper tube sheet 45 in order to act as weirs to facilitate flowing of the liquid melt as a thin film, 0.1 inch thick, along the inner periphery of the tubes. Generally, the film will have a maximum thickness of about 0.25 inch, preferably about 0.1 inch. Thus, the liquid gravitates down the inside of the tubes into the lower portion of decomposer 41 and is removed from the decomposing vessel by way of line 53. The velocity of the falling liquid is usually about 4 to 6 feet per second, and the residence time does not exceed about 1.5 seconds, preferably about 1.0 to 1.2 seconds. The liquid product in line 53 is at 300° F. and is composed of 8,333 pounds per hour of urea, 177 pounds per hour of ammonia, 229 pounds per hour of carbon dioxide and 2000 pounds per hour of water.

As noted, tubes 43 extend above upper tube sheet 45 and to facilitate flow of the partially decomposed liquid melt as a thin film down the insides of tubes 43 the latter may be notched in their upper surface as at 55 to assure the uniform flow of liquid down all the tubes. Thus, each tube can be V-notched with the bottom of the V in each tube being essentially the same distance above upper tube sheet 45, e.g. 0.25 inch. The bottom of the notches is sufficiently above tube sheet 45 to provide accumulation of partially decomposed liquid melt and the desired weir action. The depth of the accumulated liquid will usually not exceed about 1.0 inch. The residence time of the liquid in the separation zone generally does not exceed about 20 seconds, preferably being about 5 to 10 seconds, especially if the separation zone is at decomposition temperature.

The partially decomposed melt passes by gravity down tubes 43 and in a manner to leave the middle portion of the tubes free of liquid, e.g. a free space of at least about 0.25 inch across, thereby providing continuous vapor spaces adjacent the liquid for the entire length of the tubes to permit separation and upward flow of ammonia and carbon dioxide vapors. The released vapors thus pass countercurrently to the flow of liquid and into separating vessel 37. The vapors from the heated second decomposition stage combine with those of the initial decomposition zone and the combined vapor phase is withdrawn by way of line 39 at the rate of 6,893 pounds/hr. of ammonia, 1,297 pounds/hr. of carbon dioxide and 500 pounds/hr. of water. Accordingly, the carbamate decomposition is carried out conveniently and economically with minimum processing equipment to yield a urea melt of essentially no biuret content and having a small amount of ammonia, the latter being sufficiently low to enable essentially complete carbamate decomposition to be accomplished.

Although the present invention has been described with reference to a specific operating example, it is apparent that other reaction conditions and systems may be used. Thus, the urea synthesis may be conducted over a wide range of elevated temperatures and pressures, for instance, at about 160 to 250° C. and about 2,500 to 10,000 p.s.i.g. The carbon dioxide and ammonia may be used in amounts from about stoichiometric to about a 200% excess of ammonia, with the liquid melt containing about 10-60% carbamate and 40-90% urea based on their mixture.

Representative operations of the decomposer, include reduction in pressure for the entering melt to about atmospheric to a 400 p.s.i.g., preferably about 85 p.s.i.g. to 320 p.s.i.g. The decomposition stages are generally operated at temperatures in the range of about 220-320° F. with it being preferred to conduct the initial decomposition at temperatures up to about 285° F. and the second decomposition at temperatures of at least 295° F. The decomposition system usually is operated at pressures within the range of 85 p.s.i.g. to 320 p.s.i.g. or 400 p.s.i.g. The decomposer will, in many cases, react about 75-95% of the carbamate with the remaining decomposition occurring in the second decomposition stage. I prefer that the separation zone be under the same temperature and pressure conditions as the ranges noted for the decomposition zones, advantageously the first decomposition zone.

Although my invention has been described with reference to the equipment shown in the drawings, variations may be made. For instance, instead of indirect heating in the decomposition stages, direct heating as with steam might be used and in the second decomposition zone, the liquid may be handled in a different manner to provide the necessary and adjacent vapor separation spaces, for instance the liquid might be passed along vertically spaced baffles extending through this decomposition zone, providing the thin films are maintained. Also, the two decomposition stages and intermediate separation zone may be provided in separate vessels although the unitary system of the drawing is highly advantageous. The same is true with regard to the accumulation of partially decomposed melt in the second decomposition stage, that is, such accumulation is preferred.

From the foregoing, it is seen that my invention provides for efficient and inexpensive partial decomposition of a liquid material according to a chemical equilibrium reaction, and separation of the vapors formed by an advantageous arrangement of distinct decomposition and separation operations. As applied to the carbamate decomposition system, the method can afford a urea product which is low in ammonia content and essentially free of carbamate and biuret.

Having described my invention, I claim:

1. In a method for decomposing liquid ammonium carbamate contained in a mixture consisting essentially of said carbamate, urea, ammonia and water and separating therefrom vaporous ammonia and carbon dioxide, in which method decomposition is carried out in two discrete temperature zones each maintained at from 220° F. to 320° F. and at a pressure of about 85 to 400 p.s.i.g. and including the steps of passing said liquid mixture through a first, heated, primary decomposition zone whereby carbamate decomposes to form gaseous ammonia and carbon dioxide, said liquid and formed vapors passing concurrently as a mixed phase through said first heated zone and passing the liquid effluent of said first heated zone through a second, heated, decomposition zone to decompose a further amount of carbamate and form additional ammonia and carbon dioxide vapors, the flow of said liquid through said second zone being as a relatively thin falling film of about 0.25 inch maximum thickness with space adjacent to said falling film being provided for separation of formed vaporous ammonia and carbon dioxide, the improvement of withdrawing essentially all carbon dioxide and ammonia vapors from a single separation zone maintained at a common pressure with that of both of said decomposition zones and located downstream of said first heated decomposition zone and vertically above said second decomposition zone, the liquid passing downwardly under the influence of gravity from said separation zone through said second decomposition zone and the vapors formed therein passing upwardly to said separation zone.

2. The method of claim 1 wherein the temperature of said first decomposition zone is about 220 to 285° F., the pressure in said first decomposition zone is 85 p.s.i.g. to 320 p.s.i.g. with the residence time being sufficient to provide decomposition of about 75 to 95% of said ammonium carbamate.

3. The method of claim 1 wherein the second decomposition stage is at a temperature of about 295 to 320° F.

References Cited
UNITED STATES PATENTS

| | | | |
|---|---|---|---|
| 2,848,493 | 8/1958 | Dewling et al. | 260—555 |
| 2,933,526 | 4/1960 | Guyer et al. | 260—555 |

LEON ZITVER, Primary Examiner

MICHAEL W. GLYNN, Assistant Examiner

U.S. Cl. X.R.

23—283, 285; 203—72